*D. Berlew,*

*Making Sash.*

N° 16,427.  Patented Jan. 13, 1857.

UNITED STATES PATENT OFFICE.

DANIEL BERLEW, OF DELAWARE, OHIO.

METHOD OF MAKING SASHES, &c.

Specification of Letters Patent No. 16,427, dated January 13, 1857.

*To all whom it may concern:*

Be it known that I, DANIEL BERLEW, of Delaware, in the county of Delaware, in the State of Ohio, have invented a new and Improved Mode of Planing and Coping Sash; and I do hereby declare that the following is a full, clear, and exact description of the construction and operation of same, reference being had to the annexed drawings, and letters of reference marked thereon, making a part of this specification, in which—

Figure 1:
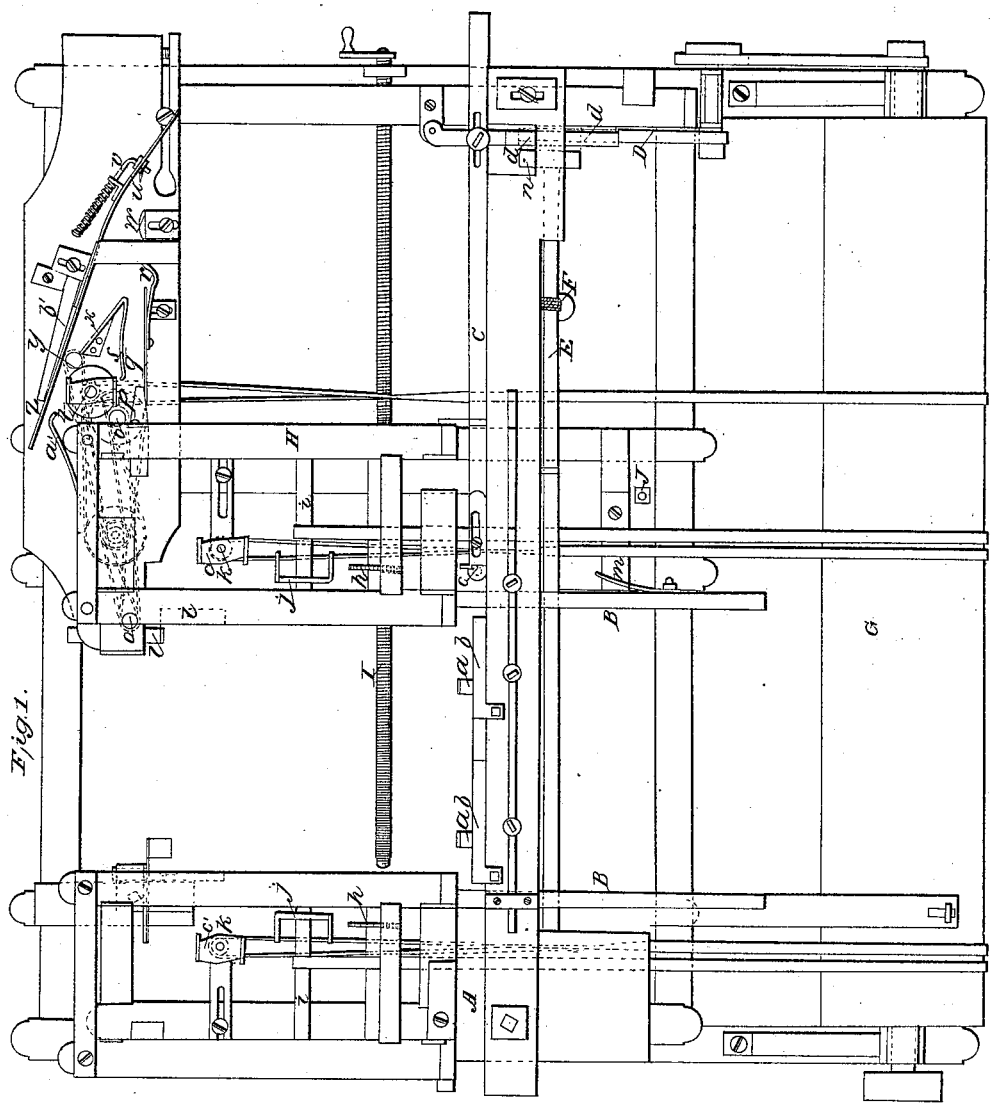
Figure 2:
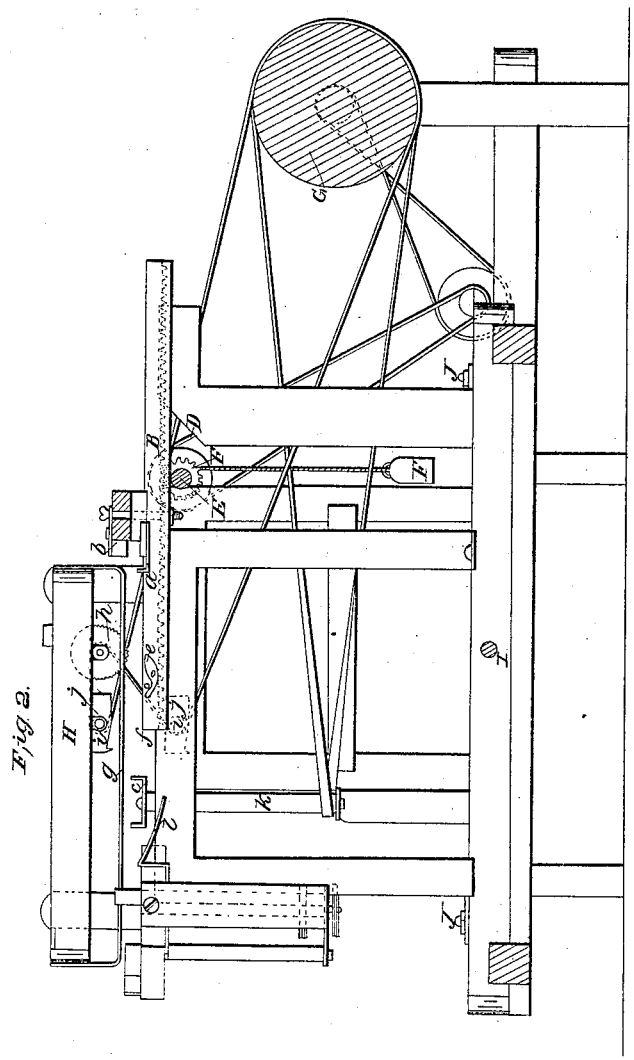

Figure 1, is a top view. Fig. 2, is a section.

My invention consists in the combination and arrangement of the hereinafter described devices for planing making sash, etc., whereby I am enabled to facilitate the operation of planing making sash, etc.

In making sash, &c., the required pieces are sawed out by a circular saw (such as are commonly used) and as the pieces are sawed they are necessarily moved from the saw by the piece in process of sawing on to the reciprocating carriage. The forward end of the piece moves a cant bar and the carriage moves forward carrying the piece at right angles through the operation of cutting it to a desired length, tenoning and coping, after which it is received by hooked springs and the reciprocating carriage returns for the piece next following; in the meantime the former piece is moved forward endwise through the operation of planing or molding.

By this machine one hand is enabled to do as much work as would require the manual labor of five or six with the advantages of the machinery in present use.

For the advantage of those wishing to manufacture and use my machine I give the following description: In making sash, &c., the required pieces are sawed out as above described passing through an adjustable groove A on to the reciprocating carriage B and guided in position by springs $a$, $a$, and $b$, $b$, until the piece is forced by the sawyer against an adjustable pin $c$ on cant bar C which adjusts the band D on to the tight pulley on shaft E, to which are attached cog wheels F, one of which is adjustable, that carry the reciprocating carriage B. To the carriage B are attached stanchions $e$ with spurs $f$, which are forced into the piece as the carriage B moves forward. Springs $a$, $a$, detain the piece sufficient to set the spurs $f$ into the piece, after which the springs $a$, $a$, are forced down allowing the carriage B, with piece to move forward. Compressors $g$, steady the piece. Circular saws $h$, $h$, cut the piece to a desired length. The tenon is made by rotary knives $j$, $j$, on cylinders $i$, $i$. Knives $c'$, $c'$, on heads on upright shafts $k$ $k$, cope or mold the shoulder on the tenon, after which the piece is discharged from the carriage B, on hooked springs $z$, $z$, and the wedge $m$ on the carriage returns band D on to the loose pulley $n$. By pin $c$ on cant bar C and weight and cord F returns the carriage B for the piece next following. Meantime the former piece is being moved forward endwise by feed rollers $o$, $o$, guided by hooked springs $p$, $p$, adjustable rest $q$, spring $r$, spring guard $s$, and adjustable guide $r$ and the piece is stuck, molded, or planed by knives on rotary head $t$ on upright shaft. The forward end of the piece is guided into hooked spring $v$ after the rear end of piece passes the spring guard $s$. Spring $r$, slotted spring $u$ and fulcrum $w$ change it on to guard $x$ and the recoil of hooked spring $v$ in slotted spring $u$ brings the rear end to the opposite side of rotary head $t$ and is moved forward by feed roller $y$, and is guided by projecting bar $z$, spring $a'$, spring $b$, and adjustable guide $z$ and is stuck, molded or planed by rotary head $t$. On the opposite side or edge of the piece the circular saws $h$ $h$, rotary cylinders $c'$ $c'$, upright shafts $z$, $z$, are all carried by bands on drum G. Feed rollers $o$, $o$, are carried by band on shaft $k$ $k$. The frame H, and carriage sill B are adjusted to suit desired lengths by a long screw I and secured by set screws J, J. Cog wheel F, is adjusted to suit carriage sill B, by means of a key.

I only am aware that tenoning and coping heads have been used before. Those I do not claim.

What I do claim and desire to secure by Letters Patent is—

The combination with the reciprocating carriage B and frame H, hooked and slotted springs $v$, $u$, or their equivalents all arranged and operated as above set forth.

DANIEL BERLEW.

Witnesses:
JOSEPH SMITH,
A. J. VANDERGRIFT.